F. FELDHAUS.
STEEL TIRE.
APPLICATION FILED NOV. 13, 1914.
1,158,038.
Patented Oct. 26, 1915.
2 SHEETS—SHEET 2.
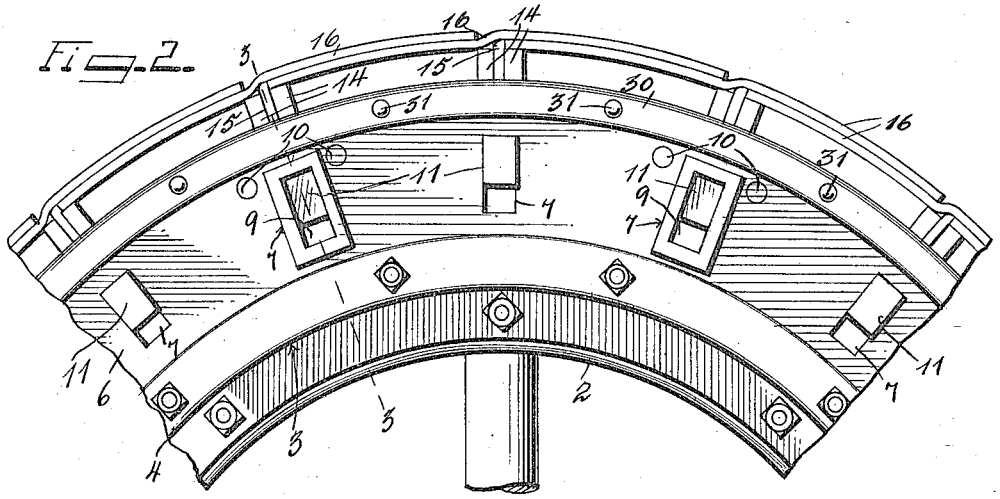
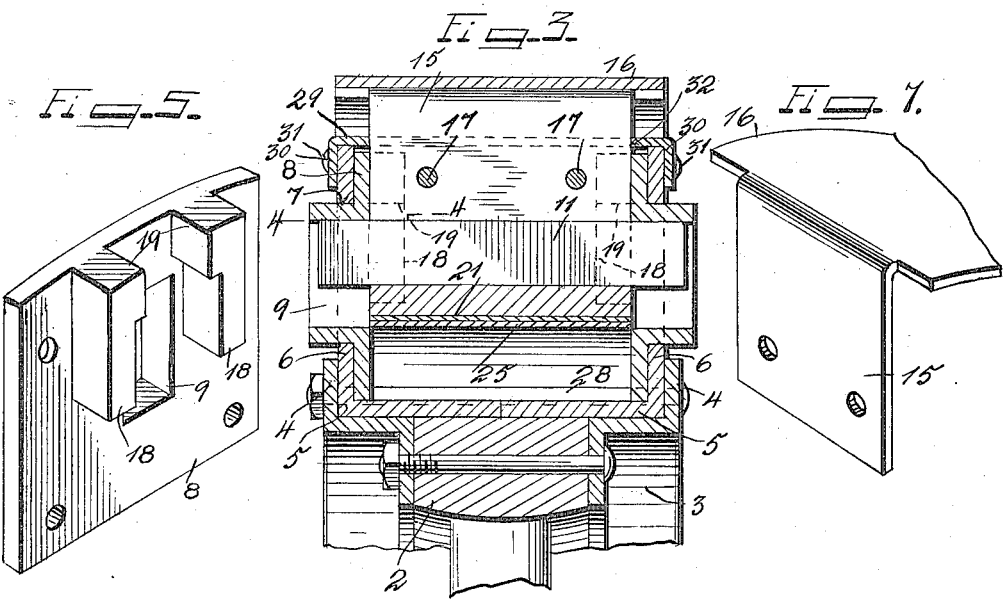
Inventor
Fred Feldhaus.
Witnesses

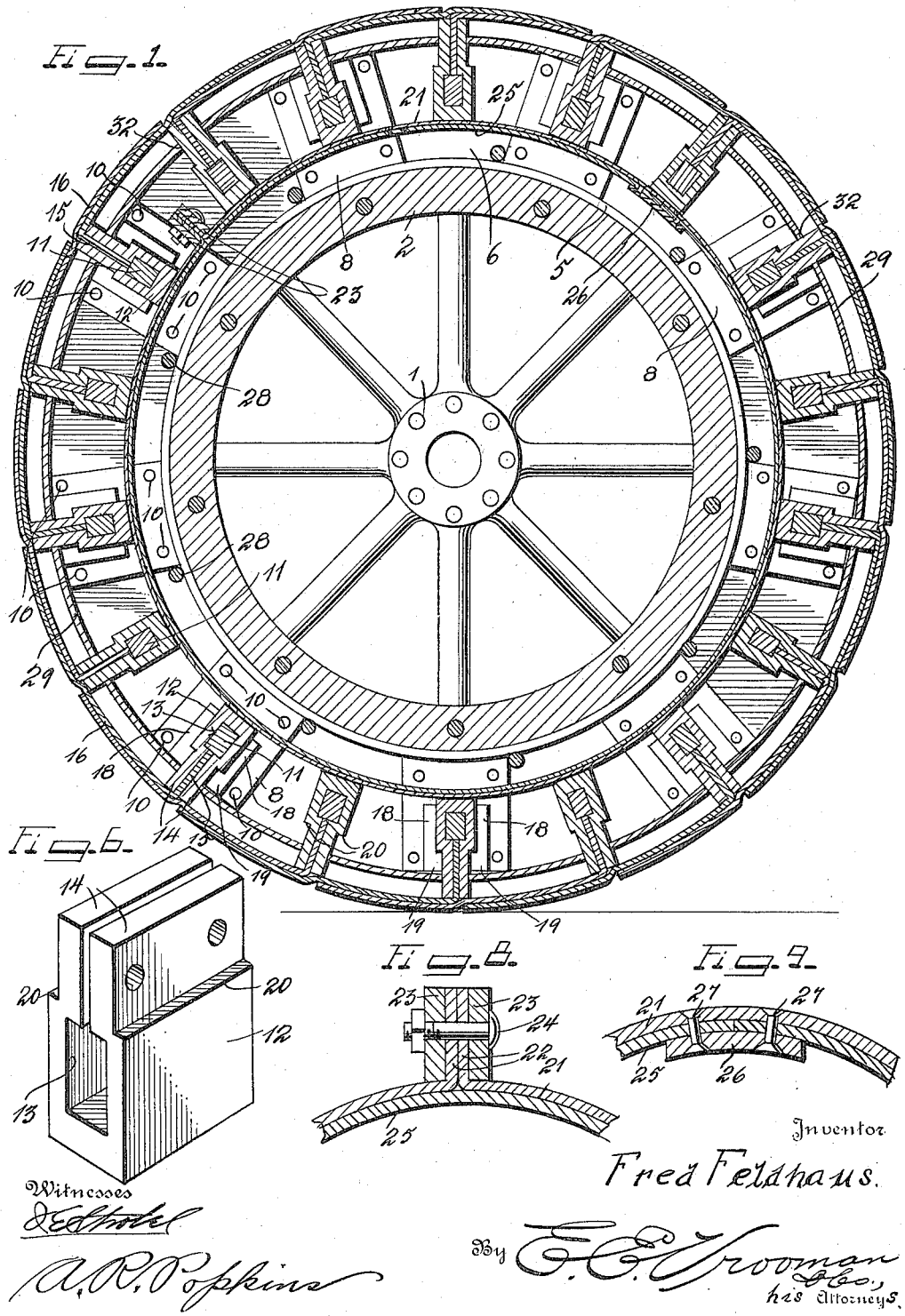

UNITED STATES PATENT OFFICE.

FRED FELDHAUS, OF AKRON, OHIO.

STEEL TIRE.

1,158,038. Specification of Letters Patent. Patented Oct. 26, 1915.

Application filed November 13, 1914. Serial No. 871,989.

*To all whom it may concern:*

Be it known that I, FRED FELDHAUS, a citizen of the United States, residing at Akron, in the county of Summit and State of Ohio, have invented certain new and useful Improvements in Steel Tires, of which the following is a specification, reference being had therein to the accompanying drawing.

This invention relates to steel tires and has for its object the production of a simple and efficient steel tire which will possess the desired resiliency for the purpose of absorbing shocks due to the unevenness of the road over which the tire or wheel is adapted to travel.

Another object of this invention is the production of a simple and efficient steel tire which comprises a minimum number of parts, thereby greatly cheapening the manufacture of the device.

With these and other objects in view this invention consists of certain novel combinations, constructions, and arrangements of parts as will be hereinafter fully described and claimed.

In the accompanying drawings: Figure 1 is a central vertical section through the tire. Fig. 2 is a side elevation of a portion of the tire. Fig. 3 is a section taken on line 3—3, of Fig. 2. Fig. 4 is a section taken on line 4—4, of Fig. 3. Fig. 5 is a perspective view of the inner face of the socket plate used in connection with the present invention. Fig. 6 is a perspective view of one of the tread plate supporting blocks. Fig. 7 is a perspective view of one end of one of the tread plates. Fig. 8 is an enlarged sectional view through the connecting means for securing the respective ends of the outer resilient band together. Fig. 9 is an enlarged sectional view showing the manner of connecting the inner band to the outer band and the means for connecting the respective ends of the inner band together.

By referring to the drawings it will be seen that 1 designates the main portion of the wheel which is provided with a felly 2, and upon each side of the felly 2 is secured a retaining plate 3 of a substantially Z-shaped structure in cross-section, thereby producing an outwardly extending flange portion 4 for retaining the tire upon the felly 2 of the wheel.

A plurality of felly plates 5 are placed upon the felly 2 and upon the retaining plates 3, and each of these plates 5 is provided with an upwardly extending flange portion 6, which flange portions constitute side plates for the tire. These flange portions 6 are provided with a plurality of radially arranged apertures 7 as clearly illustrated in Fig. 2. A socket plate 8 is placed adjacent some of the apertures 7 and has a projecting collar portion 9 extending through the apertures 7. This plate 8 is secured to the inner face of the flange portion 6 by means of rivets or other suitable securing means 10. The aperture 7 and also the collar portions 9 are formed so as to produce elongated openings for the purpose of allowing the retaining bar 11 to have a reciprocating movement within the apertures and sockets above mentioned. The retaining bar 11 extends transversely of the tire and has its respective ends working in the aperture 7 and in the collars 9 as illustrated in Figs. 2 and 3.

Each of the bars 11 is carried by a supporting block 12, which supporting block comprises a body portion having an elongated aperture 13 formed transversely thereof for the purpose of receiving the bar 11. The block 12 is also provided with a plurality of spaced lips 14 which extend outwardly from the outer end thereof and between these lips 14 of the respective blocks 12 is fixedly secured the depending portion 15 of the tread plates 16. The depending portion 15 is held in engagement with the lips 14 by means of bolts, rivets or any other suitable or desired means 17.

Each of the socket plates 8 is provided upon its inner face with a plurality of cleats 18 placed upon either side of the collar 9, and each cleat is provided with an overhanging head 19 for fitting over the shoulder portion 20 formed upon the block 12. These head portions 19 will limit the outward movement of the blocks 12 as clearly illustrated in Fig. 1.

By carefully considering Fig. 1 it will be seen that the blocks 12 are supported upon an outer spring band 21, which band has its respective ends 22 extending outwardly and being clamped together by means of the clamping plates 23. A bolt 24 passes through the plates 23 and the ends 22 for firmly securing the respective ends of the band 21 together. A reinforcing band 25 is placed under the outer band 21 and the respective ends of the band 25 are held together by means of an adjoining plate 26 which fits under the band 25, and the rivets 27 pass through the plate 26, the band 25 and the band 21 for firmly holding the bands together and also holding the respective ends of the band 25 in a fixed position. As previously stated the blocks 12 support the tread plates 16, and these tread plates are so formed as to have their tread portions overlapping as illustrated in Fig. 1 so as to present a double thickness of plates along the entire periphery of the wheel. A plurality of transversely extending bolts 28 are carried by the side flanges 6 of the felly plates 5 and extend transversely through the tire so as to normally rest upon the base portion of the felly plates 5 as is illustrated in Fig. 1 and constitute a means for limiting the inward movement of the spring bands 21 and 25. The sealing band 29 extends around the tire and rests upon the outer edge of the flange portion 6 as is clearly illustrated in Fig. 3, and this band is provided with inwardly extending flanges 30, which flanges are fixedly secured to the flanges 6 by means of rivets 31. The band 29 is provided with a plurality of apertures 32 to allow the outer portions of the blocks 12 to extend therethrough and it should be understood that this sealing band 29 will constitute an efficient means for keeping dirt and other accumulation from the interior portion of the tire.

From the foregoing description it will be seen that a very simple and efficient means has been produced for yieldably supporting the outer tread plates 16 of the tire by means of the spring bands 21 and 25, and that the tire will readily give while passing over obstructions or rough places in the road, and that owing to the peculiar construction of the present device, the parts will not be likely to become broken.

Having thus described the invention what is claimed as new, is:—

1. A wheel of the class described comprising a felly, felly plates carried thereby, said felly plates provided with outwardly extending flanges having apertures formed therein, a spring band, blocks carried by said spring band, a bar carried by each block and provided with projecting ends adapted to work in said apertures, a tread plate carried by each block, said blocks being spaced from each other, and said tread plates overlapping each other and spanning the distance between said blocks for constituting a tire for said wheel.

2. A wheel of the class described comprising a felly, felly plates carried thereby, said felly plates provided with flanges, said flanges provided with apertures formed therein, socket plates fitting over said apertures, each socket plate provided with a projecting collar fitting in said aperture in said felly plate, inwardly extending cleats carried by the inner face of said felly plate, said cleats provided with overhanging heads, blocks carried between said felly plates, a bar carried by each block and having its ends working in said collar, resilient means supporting said blocks, each block provided with projecting lips, each block provided with a shoulder formed adjacent each lip, said heads adapted to engage said shoulders for limiting the outward movement thereof, a tread plate carried by each block, each tread plate provided with a depending end fitting between said lips of said blocks, and the tread portion of said tread plates overlapping for constituting an efficient rim for said wheel.

In testimony whereof I hereunto affix my signature in presence of two witnesses.

FRED FELDHAUS.

Witnesses:
B. A. ROMWEHER,
HATTIE FELDHAUS.

Copies of this patent may be obtained for five cents each, by addressing the "Commissioner of Patents, Washington, D. C."